United States Patent
Grabelsky et al.

(10) Patent No.: US 7,634,577 B1
(45) Date of Patent: Dec. 15, 2009

(54) MEDIA GATEWAY PROXY

(75) Inventors: David A. Grabelsky, Skokie, IL (US); Boris Bekkerman, Buffalo Grove, IL (US); John Poplett, River Forest, IL (US); Sudhakar Ramakrishna, Mt. Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 830 days.

(21) Appl. No.: 10/827,009

(22) Filed: Apr. 19, 2004

Related U.S. Application Data

(63) Continuation of application No. 09/645,247, filed on Aug. 24, 2000, now Pat. No. 6,766,377.

(51) Int. Cl.
  *G06F 15/173* (2006.01)
  *G06F 15/16* (2006.01)
  *H04L 12/66* (2006.01)
(52) U.S. Cl. .................. 709/238; 709/218; 709/245; 370/356
(58) Field of Classification Search ......... 709/236–245, 709/217–219, 223–230; 370/352–356, 401
See application file for complete search history.

(56) References Cited

U.S. PATENT DOCUMENTS

| | | | |
|---|---|---|---|
| 6,754,180 B1 * | 6/2004 | Christie | 370/236 |
| 6,799,210 B1 * | 9/2004 | Gentry et al. | 709/223 |
| 6,885,658 B1 * | 4/2005 | Ress et al. | 370/352 |
| 6,937,598 B1 * | 8/2005 | Hagirahim et al. | 370/356 |
| 6,944,166 B1 * | 9/2005 | Perinpanathan et al. | 370/401 |
| 6,950,441 B1 * | 9/2005 | Kaczmarczyk et al. | 370/467 |

* cited by examiner

*Primary Examiner*—Yasin M Barqadle
(74) *Attorney, Agent, or Firm*—McDonnell Boehnen Hulbert & Berghoff LLP

(57) ABSTRACT

A Media Gateway proxy receives a message and parses the message. The message contains an attribute, sub-command, and a destination address. The proxy stores the message and the attributes. Each of the attributes corresponds to a selected one of a plurality of Media Gateways. Each of the gateways has an address. The proxy finds in the memory the address of the selected Media Gateway using the destination address and the attribute. The proxy then forms a message using said sub-command, said address, and said attribute and transmits the message to the destination Media Gateway.

18 Claims, 13 Drawing Sheets

| GROUPING n 702 | | |
|---|---|---|
| MEDIA GATEWAY 704 | ADDRESS 706 | ATTRIBUTE INFORMATION 708 |
| MEDIA GATEWAY x 710 | ADDRESS 1 712 | ATTRIBUTE 1 714 |
| ... | ... | ... |
| MEDIA GATEWAY m 716 | ADDRESS m 718 | ATTRIBUTE m 720 |

FIG. 7

| COMMAND WITH VIRTUAL ADDRESS 802 | | | |
|---|---|---|---|
| SUB COMMAND 804 | ADDRESS 806 | RECEIVED 810 | ATTRIBUTE 824 |
| SUB COMMAND 1 812 | IP ADDRESS 1 814 | YES / NO 816 | ATTRIBUTE 1 826 |
| ... | ... | ... | ... |
| SUB COMMAND n 818 | IP ADDRESS n 820 | YES / NO 822 | ATTRIBUTE n 828 |

FIG. 8

| GROUPING 1 = 123.123.123.2 | | |
|---|---|---|
| MEDIA GATEWAY 1 | 123.123.123.3 _1004_ | T1  _1006_ |
| MEDIA GATEWAY 3 | 123.123.123.4 | T2 |
| MEDIA GATEWAY 5 | 123.123.123.5 | T3 |

| REQ 100 : ADD T1, MOD T2, SUB T3<br>VIRTUAL ADDRESS = 123.123.123.2   _1108_ | | | |
|---|---|---|---|
| ADD | 123.123.123.3 | YES | T1 |
| MOD | 123.123.123.4 | YES | T2 |
| SUB | 123.123.123.5 | NO | T3 |

_1100_

1102 (ADD row), 1104 (MOD row), 1106 (SUB row)

FIG. 11

© 2000 3Com Corporation. All rights reserved.

MEGACO/1 [123.123.123.2]:55555

Transaction = 100 {

Context = C1 {

Add = T1 {

Media {media descriptor}

}

},

Context = C2 {

Modify = T2 {

Media {media descriptor}

}

},

Context = C3 {

Subtract = T3 {

© 2000 3Com Corporation. All rights reserved.

MEGACO/1 [123.123.123.3]:55555

Transaction = 101 {

Context = C1 {

Add = T1 {

Media {media descriptor}

}

}

}

MEGACO/1 [123.123.123.4]:55555

Transaction = 102 {

Context = C2 {

Modify = T2 {

Media {media descriptor}

}

}

}

MEGACO/1 [123.123.123.5]:55555

Transaction = 103 {

Context = C3 {Substract = T3}

© 2000 3Com Corporation. All rights reserved.

MEGACO/1 [123.123.123.2]:55555

Reply = 101 {

Context = C1 {Add = T1}

}

MEGACO/1 [123.123.123.2]:55555

Reply = 103 {

Context = C3 {Subtract = T3}

}

MEGACO/1 [123.123.123.2]:55555

Reply = 102 {

Context = C2 {Modify = T2}

© 2000 3Com Corporation. All rights reserved.

MEGACO/1 [123.123.123.1]:55555

Reply = 100 {

Context = C1 {Add = T1}

Context = C2 {Modify = T2}

Context = C3 {Subtract = T3}

MEDIA GATEWAY PROXY

COPYRIGHT AUTHORIZATION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This present invention relates to the interworking of computer networks. Specifically, the invention relates to a proxy that groups Media Gateways.

BACKGROUND OF THE INVENTION

Internet telephony encompasses a number of technologies for the transport of voice traffic over Internet Protocol (IP) networks. IP telephony can be divided into a media plane, a signaling plane, and call control plate. The media plane provides functionality required for media transport, such as packetization of voice data, packet delivery, and media playout at the destination. The signaling and call control plane provides functionality required to set up, tear down, and manage calls.

One aspect of Internet Telephony is the interworking of the IP network with the existing Public Switched Telephone Network (PSNT). In the context of PSTN interworking, the media and signaling planes include expanded functionality in order to connect the different network types. Thus, the media plane incorporates components which translate and map the voice data between a circuit switched network and an IP (packet) network, enabling it to act as a gateway between the two different means of media transport. Similarly, the signaling and call control plane incorporates components which translate and map signaling and call control protocols between PSTN and IP networks, in order to set up, tear down, and manage calls which traverse both types of network.

The development of common protocols and architectures for the PSTN interworking function is a major focus of several standards bodies, including the Internet Engineering Task Force (IETF) and International Telecommunication Union (ITU). While this is a large task requiring the resolution of many technical issues, one general architecture that has emerged in which the media plane and signaling and call control plane are viewed as distinct elements. The media component is referred to as a Media Gateway (MG). The signaling and call control component is further divided into two elements. A Media Gateway Controller (MGC) both controls the MG remotely, and handles IP-side signaling and call control with peer elements on the IP network. In addition, a Signaling Gateway provides the mapping and translation between the PSTN and IP signaling and call control protocols. One problem is that the general architecture does not necessarily specify the implementation of such components. For example, the Signaling Gateway and the MGC could be implemented as a single, integrated component.

The MGC and MG are configured in a master (MGC)—slave (MG) relationship, and multiple MGs may be under the control of a single MGC. Regardless of the number of MGs under a given MGC, or the actual physical implementation of the MG, the MGC views each MG under its control as a distinct entity with which it communicates via a well-specified software interface. The various protocols that are being developed define standard sets of media processing capabilities, as well as the MGC-MG interface. Current protocols under development within the IETF include the Media Gateway Control (MEGACO) and Media Gateway Control Protocol (MGCP). Within the ITU, H.248 is the standard for the interface.

Because the MGC's only view of the MG is via the standard interface, it has no visibility into how the actual media resources are configured behind the interface in order to support the capabilities required by the interface. The media resources may be part of an integrated hardware platform (e.g., DSPs, controlling processors, and buses), or alternatively, a collection of distinct platforms, coordinated and managed by software which presents the standard MG interface to the MGC.

Thus, it is desirable to provide a virtual Media Gateway (MG) composed of multiple standalone media gateways. It would also be desirable to allow an outside entity, for example, a Media Gateway Controller (MGC), to transmit messages to a virtual Media Gateway and receive messages from a virtual Media Gateway and allow the outside entity to view the virtual Media Gateway as a single Media Gateway.

SUMMARY OF THE INVENTION

The invention relates to a virtual Media Gateway (MG) including multiple standalone media gateways. The virtual Media Gateway is a grouping, which contains multiple individual Media Gateways. Specifically, the invention relates to a Media Gateway proxy that allows an outside entity, for example, a Media Gateway Controller (MGC), to transmit messages to a virtual Media Gateway and receive messages from a virtual Media Gateway. The Media Gateway proxy allows the outside entity to view the virtual Media Gateway as a single Media Gateway.

In one embodiment of the present invention, an external Media Gateway Controller is coupled to a Media Gateway proxy via a standard software interface (e.g., MEGACO). The proxy is coupled to a plurality of Media Gateways. The Media Gateways are organized into groups. Each group is a virtual Media Gateway.

The external MGC transmits messages to the Media Gateway proxy. In one embodiment, the Media Gateway proxy comprises a frontend, middleware, and an internal MGC. The messages contain a plurality of sub-commands, attributes, and a virtual destination address. The virtual destination address is an address of a virtual Media Gateway. Each attribute relates to a particular physical Media Gateway.

The Media Gateway proxy receives the message. In one embodiment, for each sub-command, the Media Gateway proxy extracts the sub-command and the attributes associated with the sub-command. The proxy then determines the destination physical IP address (of the destination MG) for the command. In another aspect of the present invention, the proxy receives replies from the MGs. The proxy maintains a table of activity with respect to the commands it receives. The proxy maintains a record of the messages received from the MGC. When all reply messages (associated with a particular message from the MGC) have been received, the proxy aggregates the responses and sends a reply to the external MGC.

The foregoing and the other features and advantages of an illustrative embodiment of the present invention will be more readily apparent from the following detailed description which proceeds with reference to the accompanying drawings.

BRIEF DESCRIPTION OF THE DRAWINGS

Preferred embodiments of the present invention are described with reference to the following drawings, wherein:

FIG. 7 is a table showing the relationship between a virtual MG and physical MGs according to one embodiment of the present invention;

FIG. 8 is a table showing the states of the system according to one embodiment of the present invention;

FIG. 10 is an example of the mapping table according to one embodiment of the present invention;

FIG. 11 is an example of a state table according to one embodiment of the present invention;

FIG. 12 is an example of a MEGACO-like message according to one embodiment of the present invention;

FIG. 13 is an example of a MEGACO-like message according to one embodiment of the present invention;

FIG. 14 is an example of a MEGACO-like message according to one embodiment of the present invention; and FIG. 15 is an example of a MEGACO-like reply message according to one embodiment of the present invention.

DETAILED DESCRIPTION OF PREFERRED EMBODIMENTS

Figure 1:
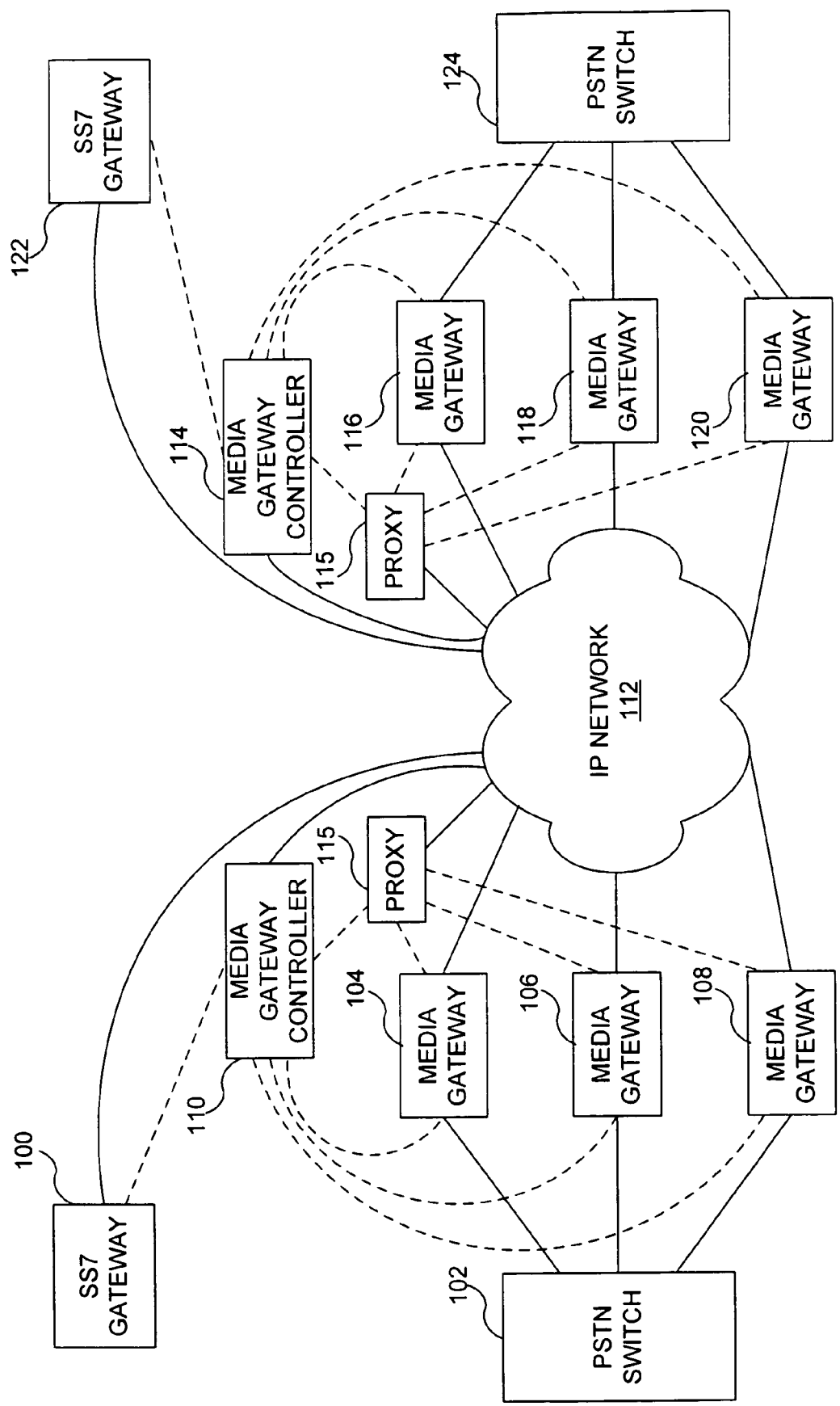
FIG. 1 is a block diagram of the overall system according to one embodiment of the present invention.

Referring now to FIG. 1, an overall system of the present invention is described. In FIG. 1, solid lines represent physical connections and dashed lines represent logical connections. For example, MGC 110 has a logical connection to MG 104, which makes use of a physical connection via the IP network 112. In general, logical connections represent communications between entities, while physical connections represent the actual physical path for logical connections.

The configuration of FIG. 1 also shows a single IP network. However, the configuration with a single IP network is exemplary, and multiple IP networks can be used to provide the physical connectivity between entities. Also, the configuration of logical and physical connections shown in FIG. 1 is exemplary. Other configurations are possible. For example, a logical connection between entities could be provided by a direct physical connection between them instead of the IP network as shown in FIG. 1.

A Signaling System 7 (SS7) gateway 100 is logically coupled to a Media Gateway Controller (MGC) 110. The MGC 110 is coupled to a proxy 115. The proxy 115, MGC 110 and a SS7 gateway 100 are connected to an IP network 112. A first Media Gateway (MG) 104, second MG 106, third MG 108, fourth MG 116, fifth MG 118, and sixth MG 120 are also coupled to the IP network 112. A PSTN switch 102 is coupled to the SS7 gateway 100 and the first MG 104, the second MG 106, and the third MG 108.

The proxy 115 is also coupled to a second MGC 114, which is coupled to a second SS7 gateway 122. The MGC 110 is also coupled to the first MG 104, the second MG 106, and the third MG 108. The MGC 114 is also coupled to the fourth MG 116, the fifth MG 118, and the sixth MG 120. The second SS7 gateway is coupled to a second PSTN switch 124, which is coupled to the fourth MG 116, the fifth MG 118, and the sixth MG 120. The proxy 115 is connected to the gateways 104, 106, 108, 16, 118, and 120. However, more than one proxy may be used.

The MG proxy groups several standalone MGs, and each group of MGs is presented as a distinct virtual MG to the outside world, for example, to the MGC 110 or 114. The media resources used in each virtual MG belong to multiple standalone MGs; there is no parent MG to the complete set of media resources represented by all of the standalone MGs. The MG proxy coordinates and manages communications between the MGC and the standalone MGs.

The events that may cause the MGC to issue commands to the MGs include signals from the PSTN, e.g., via the SS7 network, or signals from a peer MGC, via the IP network. Once the MGC determines the action required by the external event, it issues an appropriate command to one or more of the MGs under its control.

A MG proxy could be used to configure any standalone MGs that are under the control of a MGC, and to which it can communicate. The MGC could be external to several independent MGs, or could be part of a larger system of MGs in which the MG proxy is integral to the system configuration. A MG proxy could be placed anywhere in the path between a MGC and a MG. For example, the MG proxy could be placed between an external MGC and one or more standalone MGs. But it could also be placed as a secondary MG proxy between a MGC and a primary MG proxy that is used to build virtual MGs out of standalone MGs control of the primary. That is, MG proxies could be configured hierarchically.

Figure 2:
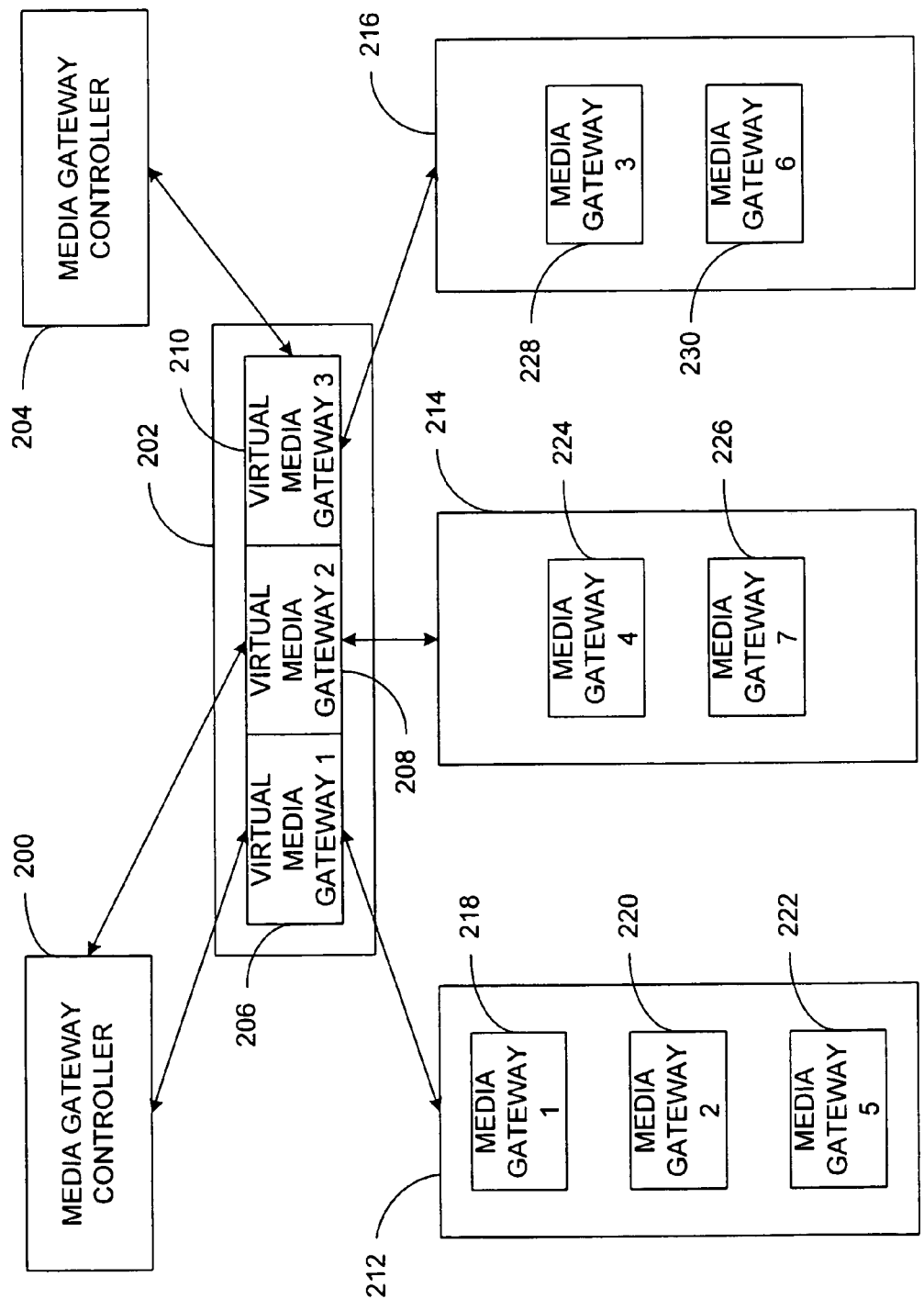
FIG. 2 is a block diagram of the overall system showing the MG proxy according to one embodiment of the present invention.

Referring now to FIG. 2, a system that uses a MG proxy is described. A first MGC 200 is coupled to a proxy 202. A second MGC 204 is also coupled to the proxy 202. The proxy 202 comprises a first virtual MG 206, a second virtual MG 208, and a third virtual MG 210. The proxy 202 is coupled to a first virtual MG grouping 212, a second virtual MG grouping 214, and a third virtual MG grouping 216. The first virtual MG grouping includes a MG1 218, MG2 220, and MG5 222. The second virtual MG grouping 214 includes MG4 224 and MG7 226. The third virtual MG grouping includes MG3 228 and MG6 230. The groupings are exemplary and could be different, for example, including a greater or fewer number of MGs.

Figure 3:
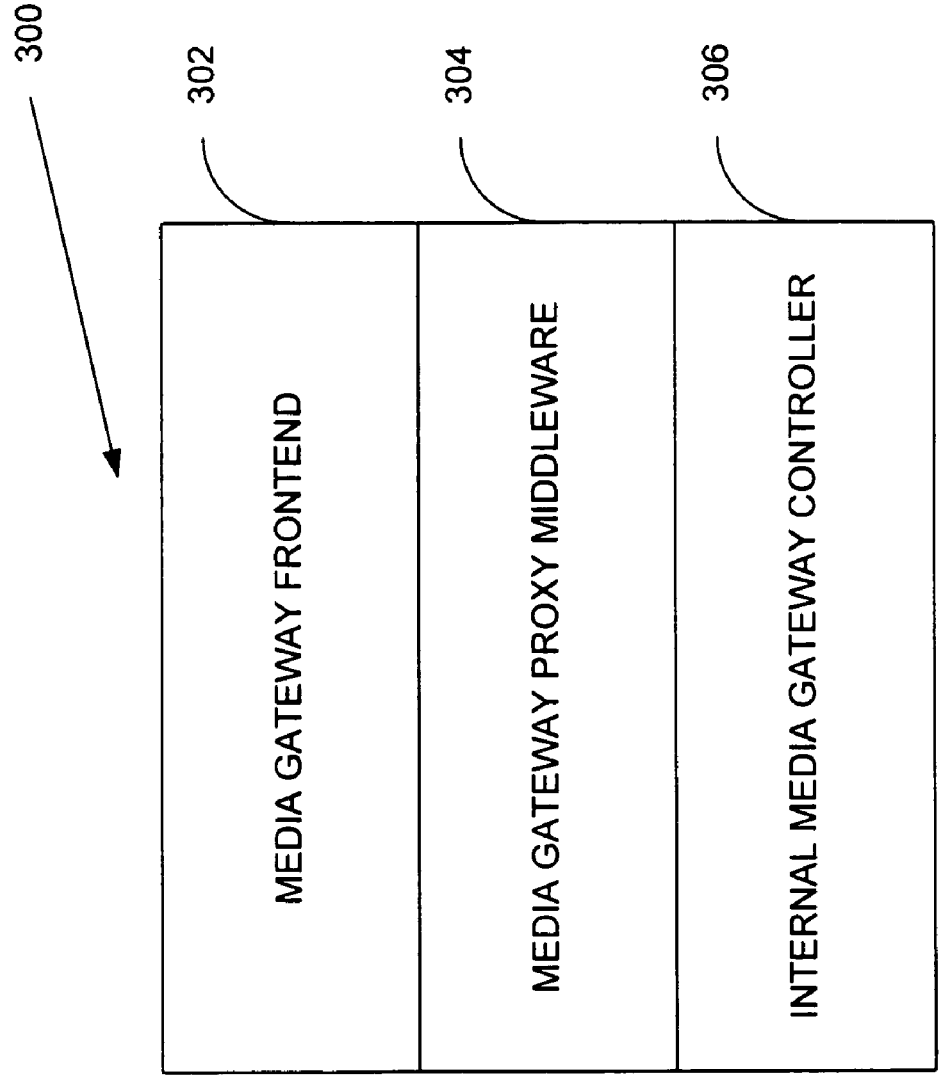
FIG. 3 is a block diagram of the media proxy according to one embodiment of the present invention.

Referring now to FIG. 3, the MG proxy is illustrated. For purposes of illustration, the MG proxy 300 comprises a MG frontend 302, a MG proxy middleware 204, and an internal MGC 306. However, the implementation shown is not the only possible one that could be used to achieve a MG Proxy. This implementation should not be seen to limit the scope of possible implementations.

The MG frontend 302 presents the standard MG interface to the external MGC (such as H.248), and implements functionality that translates commands issued by the MGC into actions on the actual MG.

The MG proxy middleware 304 translates control and management functionality passed to it by the MG frontend into appropriate requests to the internal MGC.

The MG frontend is not programmed to determine how the middleware actually accomplishes the partitioning and management of the media resources when virtual MGs are created. In one preferred embodiment of the MG proxy, the proxy middleware may accomplish this by calling on the internal MGC to help.

The internal MGC 306, in turn, issues standard commands to one or more of the MGs under its control. In analogy with the events that trigger actions by the MGCs in FIG. 1, the proxy middleware provides the events that cause the internal MGC to determine an action and issue commands to one of the MGs under its control.

Figure 4:
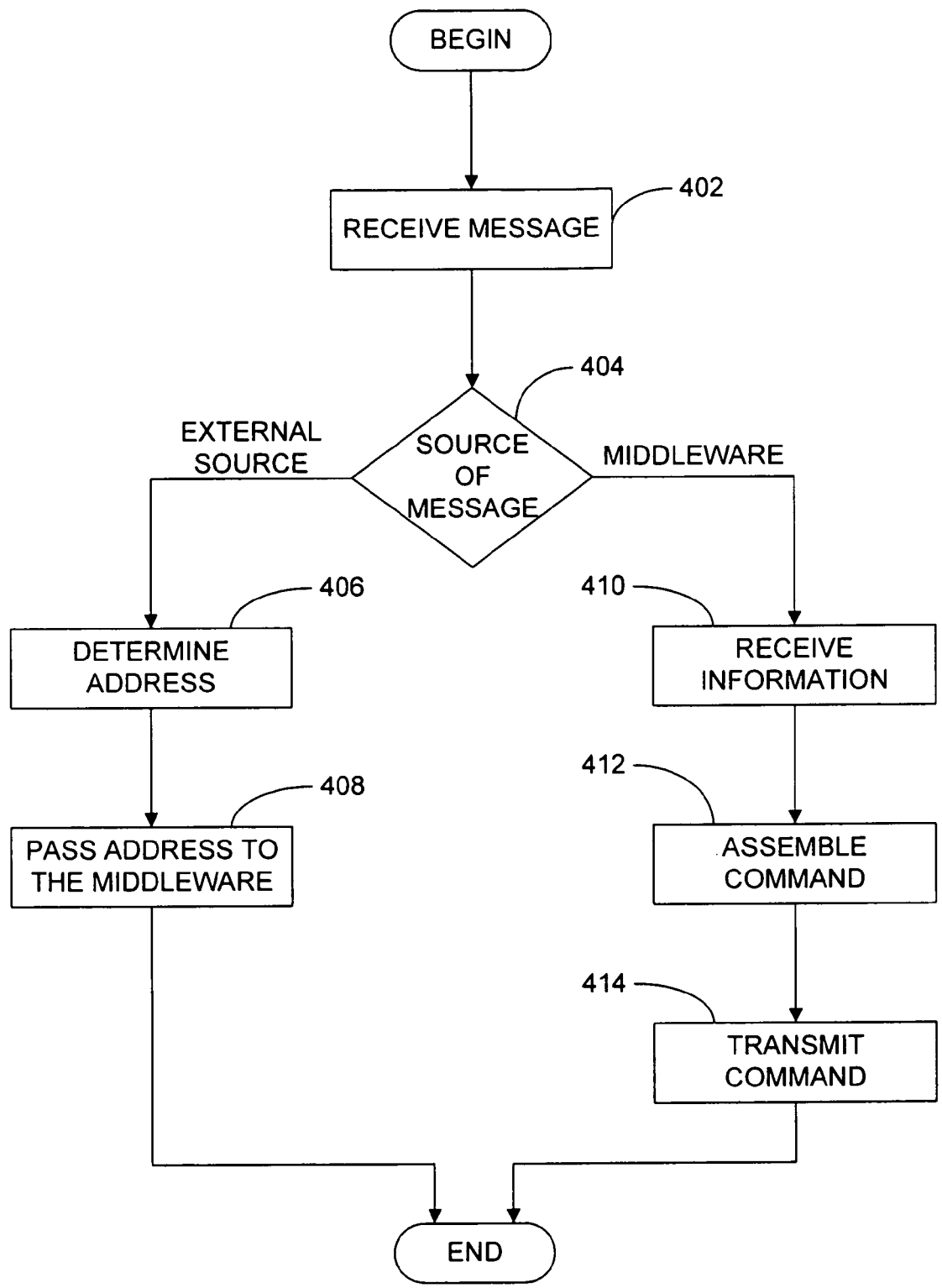
FIG. 4 is a flowchart of the operation of the frontend according to one embodiment of the present invention.

Referring now to FIG. 4, a flowchart illustrating one possible embodiment of the operation of the frontend is described. At step 402, the frontend receives a message. At step 440, it is determined if a received message is from an external source or from the middleware. If the source is external, then execution continues at step 406. If the source of the message is the middleware, then execution continues at step 410.

At step 406, the frontend examines the received command and determines the ultimate destination (e.g., a particular IP address). The ultimate destination may be an address that represents a grouping of gateways or an address representing a physical gateway. At step 408, the frontend passes the IP address and the received command to the middleware. Execution then ends.

As mentioned previously, if the source of the message is from the middleware, then at step 410, the frontend receives address, attribute, and sub-command information from the middleware. Next, at step 412, the frontend assembles the attribute, sub-command, and address information. That is, the frontend takes the address, sub-command, and attribute information received and places it together in the form of a single message. At step 414, the frontend transmits the message to the external MGC. Execution then ends. The algorithm described in reference to FIG. 4 is exemplary only; other flows are possible.

Figure 5:
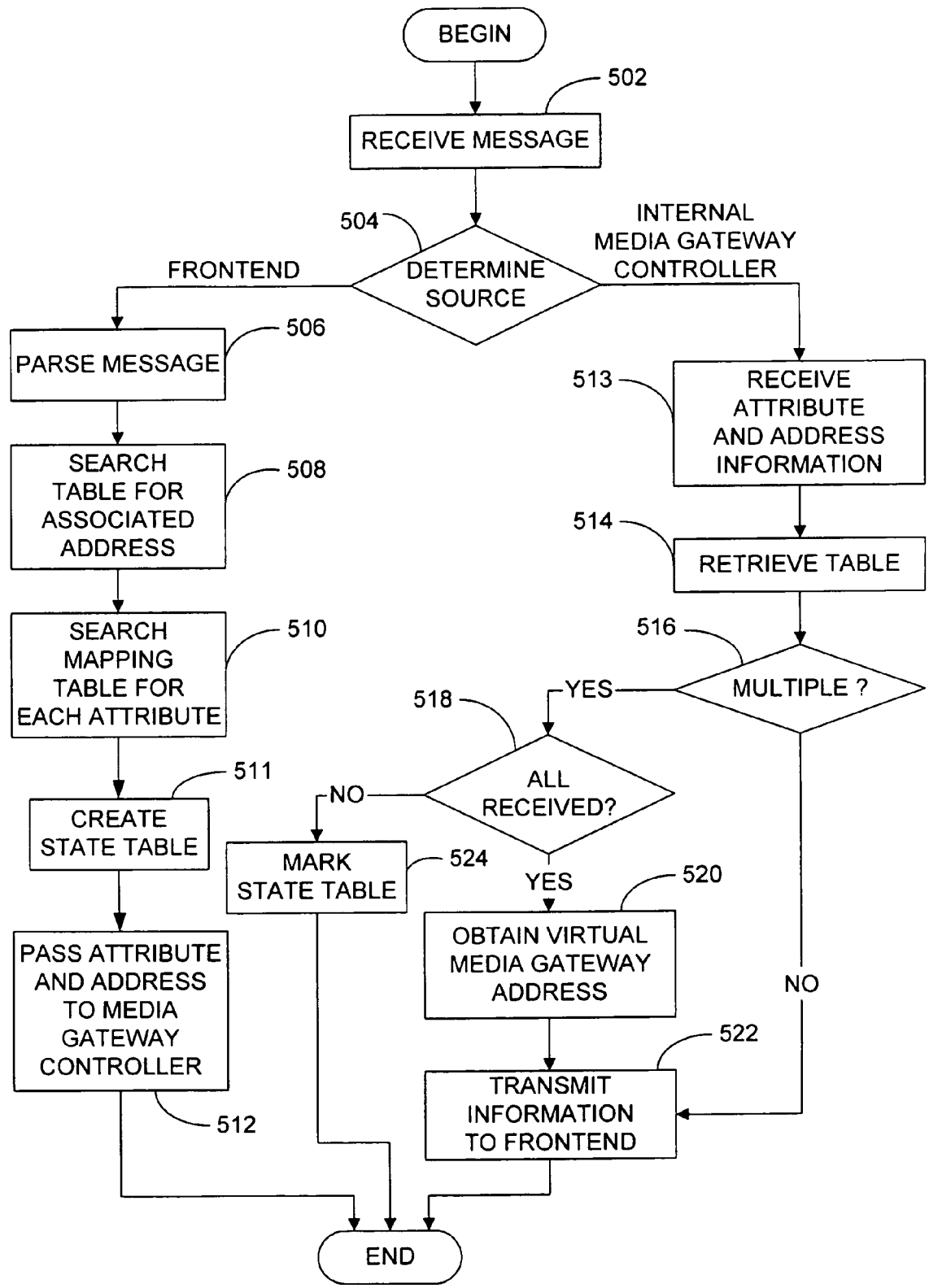
FIG. 5 is a flowchart of the operation of the middleware according to one embodiment of the present invention.

Referring now to FIG. 5, a flowchart illustrating one possible embodiment of a method of operation of the middleware is illustrated. At step 502, the middleware receives a message, either from the frontend or the internal MGC. The message may include a plurality of sub-commands and an associated attribute for each sub-command. In addition, the command may contain a destination address that represents a virtual MG. At step 504, the middleware determines whether it is a message received from the frontend or a message received from the internal MGC. If the middleware determines that the message is from the frontend, then execution continues at step 506. If the middleware determines that the source of the message is from the internal MGC, then execution continues at step 513.

At step 506, the middleware parses the message and determines that it is a plurality of sub-commands and an attribute associated with the sub-command. This parsing step separates the single message into these sub-commands and attributes, and the destination address of the virtual MG.

At step 508, the middleware searches an address table to verify the destination address is that of a virtual MG rather than that of a standalone MG. In one preferred embodiment, the address table has a first column containing the addresses of virtual MGs and a second column containing the virtual group number. This group number is used as an index by the middleware to locate a mapping table corresponding to the virtual group. In other words, the mapping tables have an associated number, the number corresponds to a virtual group number. If the address is not found in the table, then this signifies that the address is not that of a virtual MG (there is not more than one physical MG associated with the address). However, it is possible for a virtual MG to consist of a single, standalone MG.

In one preferred embodiment, each mapping table contains a first column containing a MG number, a second column with the IP address for the MG, and a third column with a corresponding attribute. At step 510, the middleware searches the mapping table for each attribute in the sub-command. After the attribute is located in the mapping table, the middleware obtains the IP address associated with the attribute. At step 511, the middleware creates a state table. This indicates to the middleware that there are outstanding transactions to the internal MGC. Each entry in the state table may have a transaction ID. At step 512, the middleware passes the attribute, IP address, and sub-command to the internal MGC. Execution then ends.

If the source of the command is from the internal MGC, then execution continues at step 513. At step 513, the middleware receives the attribute information, sub-command, and the IP addresses from the internal MGC. This information was from a reply message received from a MG. Additional information, for example, a transaction ID is possible.

At step 514, the middleware retrieves a state table. At step 516, the middleware accesses the table, since the state table indicates whether this information (from a reply message) is part of a multiple command set. That is, the middleware determines if the information is in response to a message from an external MGC, where this message contained multiple sub-commands. If this is the case, the proxy must wait until all replies have been received until a reply message is sent to the external MGC.

If the reply corresponds to a command that was part of the multiple command set, execution continues at step 518 where it is determined whether all replies to commands in the set have been received. If all replies to commands have been received, then execution continues at step 520 where the virtual MG IP address is obtained. At step 522, the middleware takes the command information (sub-command and attributes), which is already stored in the state table, along with the IP address and sends this information to the frontend. Execution then ends.

If the answer at step 516 is negative, then the middleware transmits the internal MGC information to the frontend at step 522. If the answer at step 518 is negative, then execution continues at step 524 where the table is marked to indicate that one of the replies has been received. Thus, execution ends.

Figure 6:
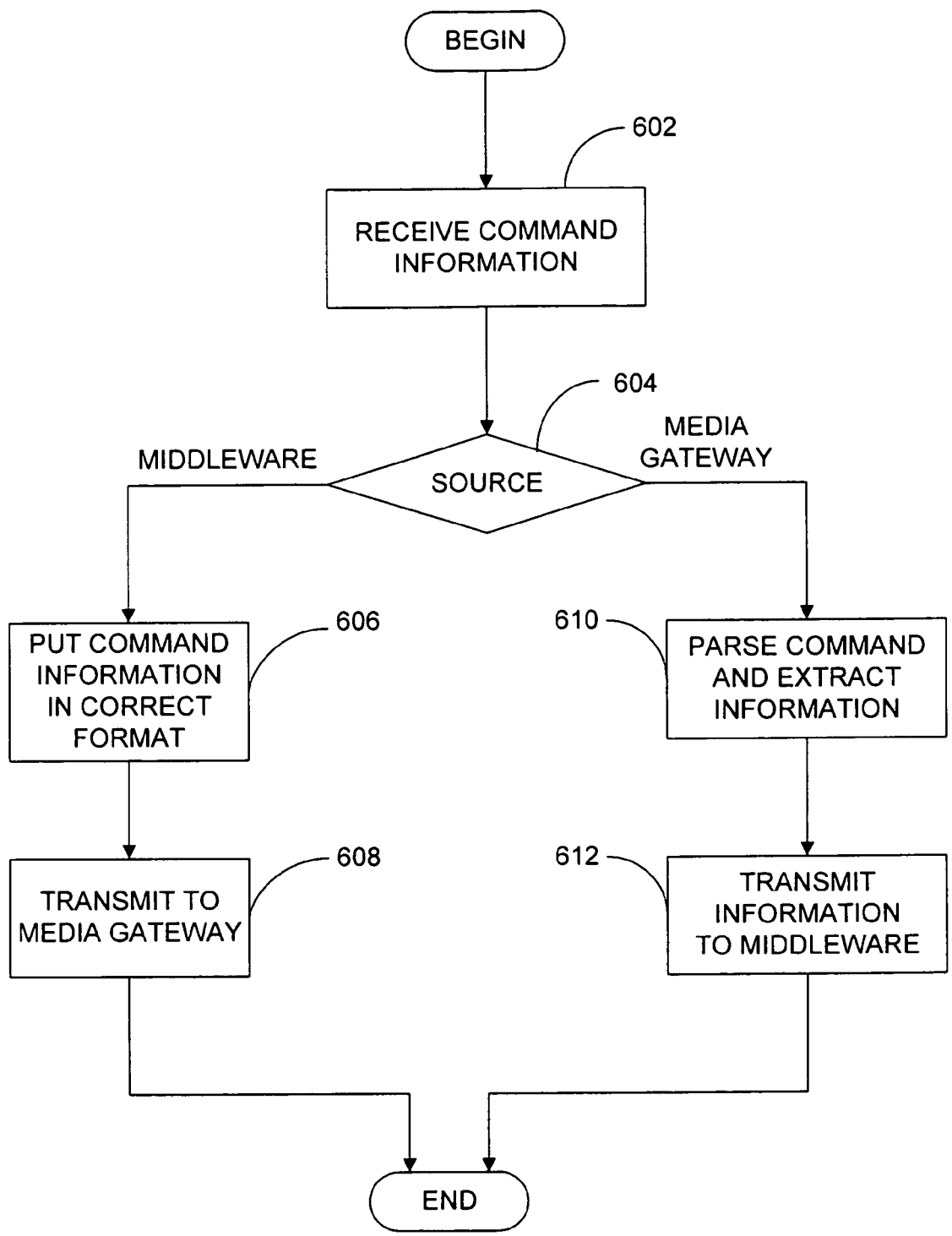
FIG. 6 is a flowchart of the operation of the internal MGC according to one embodiment of the present invention.

Referring now to FIG. 6, a flowchart illustrating one preferred embodiment of the method of operation of the internal MGC is illustrated. At step 602, the internal MGC receives command information (attributes and IP address). Next, at step 604, the internal MGC determines the source of the command information. If the determination is that the source of the information is from the middleware then execution continues at step 606. If the determination is that the command information is from a MG, then the execution continues at step 610.

At step 606, the internal MGC takes the command information from the middleware and puts it into a correct message format with the correct destination addresses. That is, the internal MGC takes an attribute and a destination address and concatenates them. At step 608, the internal MGC transmits the commands to the appropriate MG. Execution then ends.

If the internal MGC determines that the source of the received command is an external MG under its control, then execution continues at step 610. At step 610, the internal MGC parses the command received from the MG. The internal MGC extracts the IP address and the other attribute information from the command. Next, at step 612, the internal MGC passes this information to the middleware. Execution then ends.

It should be understood that functionality mentioned in relation to the frontend, middleware and internal MGC, could be situated as needed. That is, the invention is not limited to a particular functionality being placed within a certain functional entity. To the contrary, any of the functionality mentioned above with respect to a particular entity can be moved to any of the other entities.

Referring now to FIG. 7, one preferred embodiment of the mapping table used by the MG Proxy is described. The table is associated with a nth virtual group entry 702. The table comprises three columns: a MG number column 704, an address column 706, and an attribute information column 708. However, the table could contain additional or different columns, as well. The MG number column 704 contains the number of the MG. The address information column 706 contains the IP address associated with the MG in the MG column. This address could be globally routable or locally routable. The attribute information column 708 specifies additional information, for example a termination identification.

The first address entry contains a MG number MGX 710. The number may or may not be the numeral "one." An address entry ADD1 712 contains the IP address associated with the entry. An attribute entry 714 contains any additional attribute information for this entry. Similarly, a MG entry 716, address entry 718, and attribute entry 720 is associated with the mth entry in the table.

Referring now to FIG. 8, one preferred embodiment of the state table used by the MG proxy is described. A message entry 802 contains the address of a virtual MG. This message comprises a plurality of sub-commands. The address of each virtual MG has associated with it a plurality of standalone MGs. The standalone MGs each have an associated IP address.

A sub-command column 804 indicates a sub-command that has been issued to the MG. An address column 806 indicates an IP address associated with the sub-command. The IP address is the ultimate destination address for the command. A received column 810 indicates whether the reply command (associated with the sub-command) has been received from the MG. An attribute column 824 indicates the attribute associated with the command, for example, a particular termination.

An entry 812 is for the first sub-command. For example, the sub-command may be "ADD" or "DELETE." An IP address 1 entry 814 associated with this first entry. A received entry 816 indicates whether the reply message has been received from the MG. An attribute entry 826 is associated with the first sub-command. There are n sub-commands in the table. Sub-command nth entry 818, associated IP address 820, received entry 822, and attributes entry 828 are associated with the nth entry. Each entry in the table could also have a column for transaction ID.

The following example illustrates one of many possible examples of the message flow between an external MGC, MG proxy, and virtual MG. This example uses some of the naming conventions from the MEGACO ABNF specification. However, it should be understood that other specifications can be used and the invention is not limited to the MEGACO specification. The external MGC is not aware that the virtual MG is composed of different, standalone MGs. The MGC only knows that the attributes belong to virtual MG.

Figure 9:
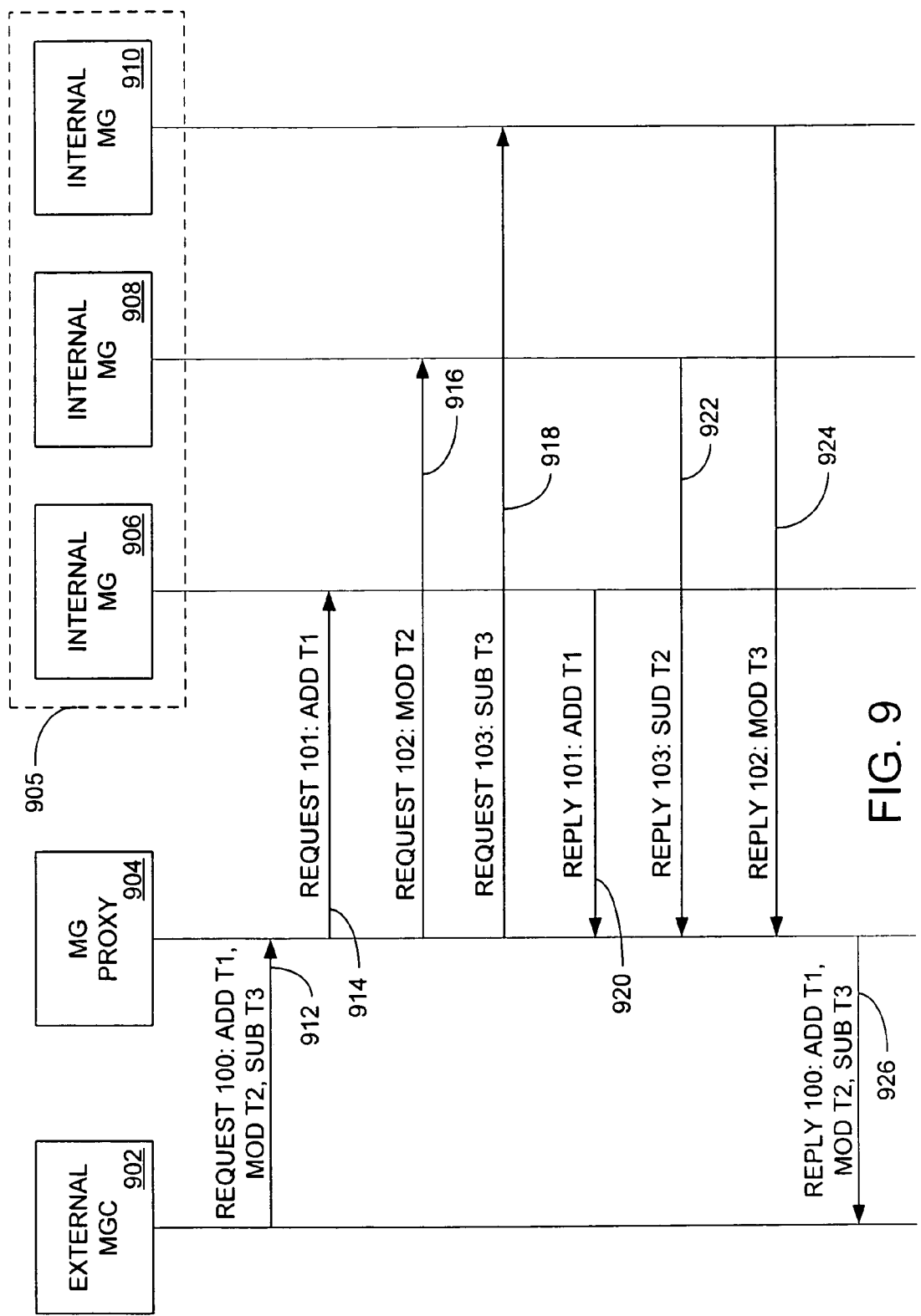
FIG. 9 is a call flow diagram illustrating the flow of messages between the MG and the MGC according to principles of the present invention.

Referring now collectively to FIGS. 9, 10, and 11, an external MGC 902 sends a message 912 to a virtual MG 905. The message 912, illustrated in FIG. 12, contains three sub-commands (Add T1, Mod T2, Sub T3). Of course, the message may include any number of sub-commands. The sub-commands specify an action that the MGC 902 wants the virtual MG 905 to take. For example, each sub-command specifies different terminations (T1, T2, and T3), corresponding to attributes, that are implemented in the virtual MG 905 and whether it is desired that a particular termination be added, subtracted or modified.

The virtual MG 905 contains standalone MG 906, standalone MG 908, and standalone MG 910. In this example, a termination T1 is contained in the standalone MG 906. A termination T2 is contained in the standalone MG 908. Finally, a termination T3 is contained in the standalone MG 910.

Each of the entities illustrated in FIG. 9 has an associated IP address. For example, the external MGC 902 has an IP address of "123.123.123.1." The MG Proxy 904 has an IP address of "123.123.123.2." The standalone MG 906 has an IP address of "123.123.123.3." The standalone MG 908 has an IP address of "123.123.123.4." Finally, the MG 910 has an IP address of "123.123.123.5." All entities may use the same port address, although this is not required. This is, all entities with the Media Gateway (the MGC 902 the MG Proxy 904, MG 906, MG 908, and MG 910). In this case, the port address is "55555."

As stated above, the external MGC 902 sends a MEGACO message 912 to the MG Proxy 904 with a single transaction request containing three commands. As stated above, the message is illustrated in FIG. 12. The message is stored in a memory in the media gateway proxy for later use.

The frontend of the proxy determines the source of the message (the external MGS 902) analyzes the destination address ("123.123.123.2") and passes the destination address ("123.123.123.2") and the message to middleware of the proxy.

The middleware takes the destination address ("123.123.123.2") and applies it to an address table. The address table has an entry for the destination address (virtual MG1). The middleware now knows that the destination address is a virtual address and locates a mapping table using MG1 as an index.

The middleware also parses the MEGACO messages into separate sub-commands and extracts the termination identifier (e.g., T1, T2, and T3) for each sub-command. The middleware then searches the mapping table 1002 for each termination identifier. In this case, the middleware finds entries relating to T1, T2, and T3. The middleware then obtains the IP addresses for each of the entries. For example, the middleware finds T1 in entry 1006 and the address associated with T1 in entry 1004 ("123.123.123.3"). The middleware performs the same operation with respect to T2 and T3.

The middleware creates a new state table with an entry for each command and marks each command as outstanding. The middleware passes the information (IP addresses, termination identifier, and command) in three separate requests to the internal MGC. The internal MGC translates these requests into MEGACO transactions 914, 916, and 918 and transmits the transactions 914, 916, and 918 to MG 906, MG 908, and MG 910. The transactions are contained in FIG. 13.

Each of the MGs 906, 908, and 910 processes the transaction and replies to the MG proxy 904. The MG 906 sends a reply 920. The MG 908 sends a reply 922. The MG 910 sends a reply 924. The replies are shown in FIG. 14.

The proxy 904 receives the replies, specifically the internal MGC portion of the Proxy. The internal MGC parses the replies and extracts the addresses ("122.123.123.3", "123.123.123.4", and "123.123.123.5"), the commands (Add, Mod, Sub), and the termination identifiers (T1, T2, and T3) and transaction IDs, if used. The internal MGC passes the addresses, commands, and termination identifiers to the MG Proxy middleware.

The MG Proxy middleware examines each reply as that reply is received. The middleware determines that the reply was part of a multiple command message. The middleware determines the exact reply received and goes to the state table 1100 that contains the corresponding command that is associated with that reply. The middleware determines whether that is the last reply to sub-command received (to complete the transaction). For example, the middleware examines the state table 1100 and determines whether all replies have been received. Since entries 1102, 1104 have been marked, the received command is the last, and the last entry will be marked and will complete the transaction, then the middleware retrieves the virtual address (in this case "123.123.123.2"). If this had not been the final reply to a sub-command, then the middleware would mark the entry in the table corresponding to the sub-command and the transaction would not be complete. When all replies to sub-commands have been received, the middleware then passes the address of the virtual MG, the termination identifiers, and the sub-commands to the frontend.

The frontend receives the address of the virtual MG, termination identifiers and replies to sub-commands, and forms a MEGACO transaction reply message. The reply message is illustrated in FIG. 15. The frontend then transmits the message to the MGC.

It should be understood that the programs, processes, methods and systems described herein are not related or limited to any particular type of computer or network system (hardware or software), unless indicated otherwise. Various types of general purpose or specialized computer systems may be used with or preform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

It will be apparent to those of ordinary skill in the art that methods involved in the present invention may be embodied in a computer program product that includes a computer usable medium. For example, such a computer usable medium can include a readable memory device, such as, a hard drive device, a CD-ROM, a DVD-ROM, or a computer diskette, having computer readable program code segments stored thereon. The computer readable medium can also include a communications or transmission medium, such as, a bus or a communications link, either optical, wired, or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. In a network device, a method comprising:
storing in physical memory of the network device first data representing a first logical grouping of a first plurality of media gateways into a first virtual media gateway, each media gateway of the first plurality being communicatively coupled with the network device via a communication network, and the first data including, for each media gateway of the first plurality, a network address and media gateway attribute;
associating a first identifier with the first logical grouping, the first identifier being a virtual network address; and
intermediating communications between a media gateway controller and the first plurality of media gateways based on at least the first identifier, the media gateway controller being communicatively coupled with the network device via the communication network, wherein intermediating communications between the media gateway controller and the first plurality of media gateways based on at least the first identifier comprises receiving a media gateway control message from the media gateway controller, the media gateway control message including the virtual network address associated with the first virtual media gateway, a sub-command, and an attribute.

2. The method of claim 1, further comprising:
storing in the physical memory of the network device second data representing a second logical grouping of a second plurality of media gateways into a second virtual media gateway, each media gateway of the second plurality being communicatively coupled with the network device via the communication network, and the second data including, for each media gateway of the second plurality, a network address and a media gateway attribute;
associating a second identifier with the second logical grouping; and
intermediating communications between the media gateway controller and the second plurality of media gateways based on at least the second identifier.

3. The method of claim 1, wherein intermediating communications between the media gateway controller and the first plurality of media gateways further comprises intermediating media gateway control messages between the media gateway controller and the first plurality of media gateways.

4. The method of claim 3, wherein the media gateway control messages comprise messages compliant with a protocol for media gateway control.

5. The method of claim 4, wherein the protocol is at least one of MEGACO and MGCP.

6. The method of claim 1, wherein intermediating communications between the media gateway controller and the first plurality of media gateways based on at least the first identifier further comprises:
determining a network address for a particular media gateway of the first plurality by matching the attribute to a media gateway attribute in the first data; and
sending the sub-command to the particular media gateway according to the network address for the particular media gateway.

7. The method of claim 1, wherein intermediating communications between the media gateway controller and the first plurality of media gateways based on at least the first identifier further comprises:

at the network device, receiving a media gateway control response message from at least one media gateway of the first plurality, the media gateway control response message being a reply to a media gateway control message sent from the media gateway controller to the at least one media gateway via the device;

forming a media gateway control transaction reply message that includes the media gateway control response message from the at least one media gateway of the first plurality, and also includes the virtual network address; and sending the media gateway control transaction reply message to the media gateway controller.

8. The method of claim 1, wherein intermediating communications between the media gateway controller and the first plurality of media gateways based on at least the first identifier further comprises:

at the network device, receiving a media gateway control message from the media gateway controller, the media gateway control message including the virtual network address associated with the first virtual media gateway, and also including a plurality of sub-commands, each sub-command being paired with an attribute;

for each respective sub-command of the plurality of sub-commands:

determining a network address for a given media gateway of the first plurality of matching the attribute paired with the respective sub-command to a media gateway attribute in the first data, sending the respective sub-command to the given media gateway according to the network address for the given media gateway, and receiving at the network device a sub-command response to the respective sub-command from the given media gateway;

forming a media gateway control transaction reply message that includes each sub-command response, and also includes the virtual network address; and sending the media gateway control transaction reply message to the media gateway controller.

9. A network device comprising:

means for storing in physical memory of the network device first data representing a first logical grouping of a first plurality of media gateways into a first virtual media gateway, wherein each media gateway of the first plurality is communicatively coupled with the network device via a communication network, and wherein the first data includes, for each media gateway of the first plurality, a network address and media gateway attribute;

means for associating a first identifier with the first logical grouping, the first identifier being a virtual network address; and means for intermediating communications between a media gateway controller and the first plurality of media gateways based on at least the first identifier, wherein the media gateway controller is communicatively coupled with the network device via the communication network, wherein intermediating communications between the media gateway controller and the first plurality of media gateways based on at least the first identifier comprises receiving a media gateway control message from the media gateway controller, the media gateway control message including the virtual network address associated with the first virtual media gateway, a sub-command, and an attribute.

10. The network device of claim 9, further comprising:

means for storing in the physical memory of the network device second data representing a second logical grouping of a second plurality of media gateways into a second virtual media gateway, wherein each media gateway of the second plurality is communicatively coupled with the network device via a communication network, and wherein the second data includes, for each media gateway of the second plurality, a network address and a media gateway attribute;

means associating a second identifier with the second logical grouping; and means intermediating communications between the media gateway controller and the second plurality of media gateways based on at least the second identifier.

11. The network device of claim 9, wherein means for intermediating communications between the media gateway controller and the first plurality of media gateways further comprise means for intermediating media gateway control messages between the media gateway controller and the first plurality of media gateways.

12. The network device of claim 11, wherein the media gateway control messages comprise messages compliant with a protocol for media gateway control.

13. The network device of claim 9, wherein means for intermediating communications between the media gateway controller and the first plurality of media gateways based on at least the first identifier further comprise:

means for determining a network address for a particular media gateway of the first plurality by matching the attribute to a media gateway attribute in the first data; and means for sending the sub-command to the particular media gateway according to the network address for the particular media gateway.

14. The network device of claim 9, wherein means for intermediating communications between the media gateway controller and the first plurality of media gateways based on at least the first identifier further comprise:

means for receiving at the network device a media gateway control response message from at least one media gateway of the first plurality, wherein the media gateway control response message is a reply to a media gateway control message sent from the media gateway controller to the at least one media gateway via the device;

means for forming a media gateway control transaction reply message that includes the media gateway control response message from the at least one media gateway of the first plurality, and also includes the virtual network address; and means for sending the media gateway control transaction reply message to the media gateway controller.

15. The network device of claim 9, wherein means for intermediating communications between the media gateway controller and the first plurality of media gateways based on at least the first identifier further comprise:

means for receiving at the network device a media gateway control message from the media gateway controller, wherein the media gateway control message includes the virtual network address associated with the first virtual media gateway, and also includes a plurality of sub-commands, wherein each sub-command is paired with an attribute;

means for, for each respective sub-command of the plurality of sub-commands;

determining a network address for a given media gateway of the first plurality by matching the attribute paired with the respective sub-command to a media gateway attribute in the first data, sending the respective sub-command to the given media gateway according to the network address for the given media gateway, and receiving at the network device a sub-command response to the respective sub-command from the given media gateway;

means for forming a media gateway control transaction reply message that includes each sub-command response, and also includes the virtual network address; and means for sending the media gateway control transaction reply message to the media gateway controller.

16. A computer-usable storage medium having stored thereon, computer-executable instructions that, if executed by a computing device, cause the computing device to perform a method comprising:

storing first data representing a first logical grouping of a first plurality of media gateways, wherein the first logical grouping comprises a first virtual media gateway, and wherein the first data includes, for each media gateway of the first plurality, a network address and media gateway attribute;

associating a first identifier with the first logical grouping, wherein the first identifier is a virtual network address; and intermediating communications between a media gateway controller and the first plurality of media gateways based on at least the first identifier, wherein intermediating communications between the media gateway controller and the first plurality of media gateways based on at least the first identifier comprises receiving a media gateway control message from the media gateway controller, the media gateway control message including the virtual network address associated with the first virtual media gateway, a sub-command, and an attribute.

17. The computer-usable storage medium of claim 16, wherein associating the first identifier with the first logical grouping comprises associating the virtual network address with the first virtual media gateway, wherein intermediating communications between the media gateway controller and the first plurality of media gateways further comprises intermediating media gateway control messages between the media gateway controller and the first plurality of media gateways, and wherein the media gateway control messages comprise messages compliant with a protocol for media gateway control.

18. The computer-usable storage medium of claim 16, wherein associating the first identifier with the first logical grouping comprises associating the virtual network address with the first virtual media gateway, and wherein intermediating communications between the media gateway controller and the first plurality of media gateways based on at least the first identifier further comprises:

for each respective sub-command of the plurality of sub-commands:

determining a network address for a given media gateway of the first plurality by matching the attribute paired with the respective sub-command to a media gateway attribute in the first data, sending the respective sub-command to the given media gateway according to the network address for the given media gateway, and receiving a sub-command response to the respective sub-command from the given media gateway;

forming a media gateway control transaction reply message that includes each sub-command response, and also includes the virtual network address; and sending the media gateway control transaction reply message to the media gateway controller.

* * * * *

UNITED STATES PATENT AND TRADEMARK OFFICE
CERTIFICATE OF CORRECTION

PATENT NO.      : 7,634,577 B1                                    Page 1 of 1
APPLICATION NO. : 10/827009
DATED           : December 15, 2009
INVENTOR(S)     : Grabelsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1265 days.

Signed and Sealed this

Ninth Day of November, 2010

David J. Kappos
*Director of the United States Patent and Trademark Office*